Feb. 9, 1960 C. W. HARRISON 2,924,708

COUNTER OR FREQUENCY DIVISION CIRCUIT

Filed Dec. 31, 1954

INVENTOR
C. W. HARRISON
BY Hugh S. Wertz
ATTORNEY

United States Patent Office 2,924,708

Patented Feb. 9, 1960

2,924,708

COUNTER OR FREQUENCY DIVISION CIRCUIT

Charles W. Harrison, Gillette, N.J., assignor to Bell Telephone Laboratories, Incorporated, New York, N.Y., a corporation of New York Application December 31, 1954, Serial No. 478,963

3 Claims. (Cl. 250—27)

This invention relates to counter or frequency divider circuits, and, more particularly, to counter circuits wherein the ratio of the frequency of the output impulses to the frequency of the input impulses is variable.

It is an object of this invention to provide an improved counter circuit having a single frequency ratio adjustment.

Counting circuits are used extensively in such devices as radiation detectors and radar systems, as well as in various kinds of experimental apparatus. With the increased use of such circuits, the need for simple adjustments and controls has increased. In addition, it is highly desirable that such circuits have provisions for automatically resetting themselves after each counting cycle. Various types of automatic resetting schemes are well known in the art, but, the problem of automatically resetting the counter to a stable voltage level while at the same time achieving an overall simplification of the counter circuit has heretofore been only partially solved.

It is another object of this invention to provide a simple counter circuit which automatically resets to a stable voltage level rapidly and accurately.

A preferred embodiment of the invention comprises a simple counter circuit including a storage capacitor and a monostable multivibrator having first and second electron discharge devices. The charging capacitor of the counter circuit is coupled to the grid of the first electron discharge device which is normally non-conducting during the stable period. In addition, the storage capacitor is connected to the grid of the second electron discharge device through an asymmetrically conducting diode. Positive pulses received at the input of the circuit are stored in the capacitor until the charge thereon is sufficient to overcome the bias on the first electron discharge device at which time that device is made conducting. When the first electron discharge device commences to conduct, the grid of the second discharge device is driven in a negative direction and the second one is made non-conducting. Under these conditions, the diode connecting the two grids conducts, discharging the capacitor and causing the multivibrator to reset to its stable condition. The pulse output of the multivibrator is the result of the counting operation. The frequency of occurrence of the output pulses is some fraction of the frequency of the input pulses, the ratio of the two frequencies being dependent upon the parameters of the circuit. Adjustment of the ratio is advantageously achieved by making one of the parameters, such as the biasing supply, variable.

Figure 1:
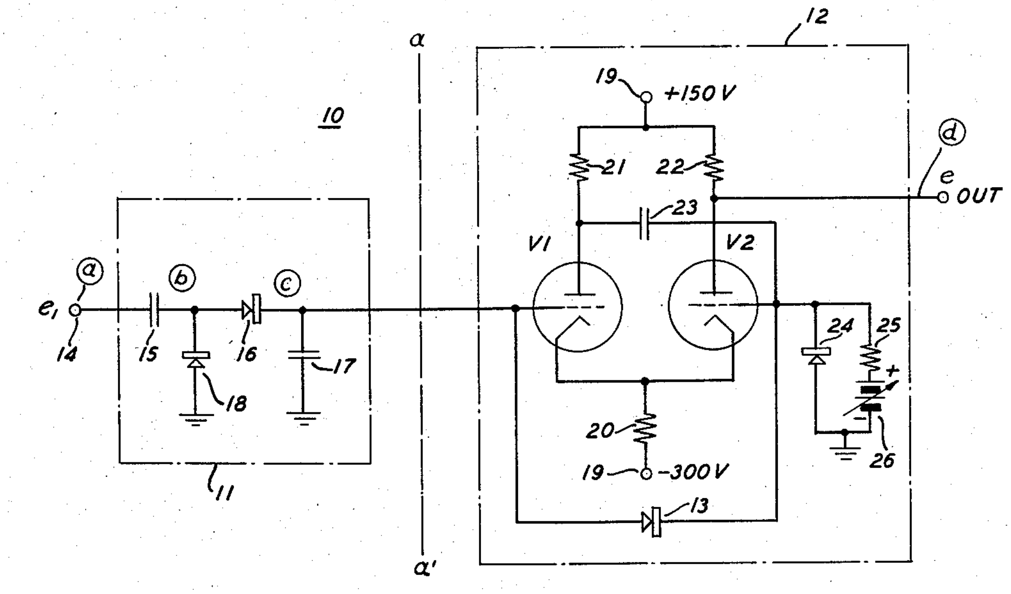
Figure 2:
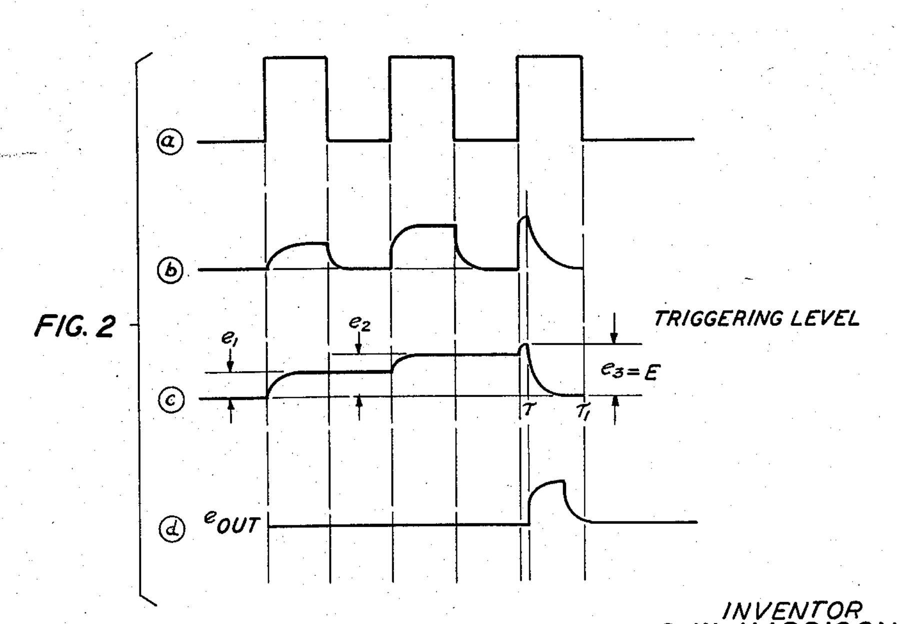

The invention will be better understood by reference to the following descriptions taken in conjunction with the drawings in which:

Fig. 1 is a schematic diagram of a counting circuit embodying the principles of the invention; and Fig. 2 is a representation of the wave forms occurring at different points in the circuit of Fig. 1.

Referring now to Fig. 1, there is shown a counter 10 which includes a storage circuit 11 and a monostable multivibrator circuit 12. Storage circuit 11 is essentially the same circuit that is shown in Figs. 17–13 of "Wave Forms," volume 19, MIT Radiation Laboratory Series, 1949, page 615, and comprises a signal input terminal 14, a trimmer condenser 15, an asymmetrically conducting device 16, a storage condenser 17 which is much larger than condenser 15, and a second asymmetrically conducting device 18, connected between ground and a point on the input lead between condenser 15 and the device 16.

The operation of such a circuit is fully explained in the aforementioned book "Wave Forms." It is sufficient for present purposes to realize that the total charge on the storage capacitor 17 is, in effect, the sum of the individual charges contributed by the input pulses.

Multivibrator circuit 12 is similar to the monostable multivibrator shown in Figs. 5–12, page 170, of the aforementioned "Wave Forms." It comprises first and second electron tubes $V_1$ and $V_2$, respectively, the cathodes of which are connected together and to a source 19 of negative potential through a resistor 20. The plates of tubes $V_1$ and $V_2$ are connected to the positive terminal of source 19 through plate resistors 21 and 22, respectively. The plate of tube $V_1$ is connected to the control grid of tube $V_2$ through a capacitor 23, and the output of the multivibrator is taken from the plate of tube $V_2$. The control grids of tubes $V_1$ and $V_2$ are connected together through an asymmetrically conducting device 13. The grid of tube $V_2$ is also connected to ground through the parallel arrangement of an asymmetrically conducting device 24 and a series connected resistor 25 and variable potential source 26. The grid of tube $V_1$ is connected to the ungrounded plate of storage capacitor 17.

The operation of the above described circuits is best understood by reference to Fig. 2 wherein are shown the wave forms at different points in the circuit for a frequency ratio of one output pulse to three input pulses. Before any pulse input, tube $V_2$ is normally conducting and tube $V_1$ is non-conducting. Since $V_2$ is conducting, the cathodes of tubes $V_1$ and $V_2$ are at the same potential, which is approximately that of the bias source 26, because of the voltage drop across resistor 20. The biasing potential supplied by source 26 therefore determines the triggering level of the tube $V_1$, since the potential on the grid of $V_1$ must exceed that bias potential before $V_1$ can "take over" from $V_2$.

Input pulses to be counted are applied to input terminal 14. These pulses may be, for example, of the shape shown in Fig. *2a*. The pulses are fed through trimmer condenser 15 to condenser 17 through device 16. Device 16 is poled to conduct when the voltage at point *b* in Fig. 1 exceeds the charge on condenser 17. When the first pulse in the train is applied to condenser 15, device 16 commences to conduct substantially immediately since the charge on condenser 17 is zero. When device 16 conducts, condensers 15 and 17 and device 16 are in series with each other and the source of pulses. If both the source impedance and the forward resistance of device 16 are low, condensers 15 and 17 act as a voltage divider, the charge on each being inversely proportional to its capacitance. It is obvious, therefore, that if condenser 17 is large as compared to condenser 15, a smaller fraction of the total voltage will be stored on condenser 17 than on condenser 15. This fraction of the total voltage is designated $e_1$ in Fig. *2c*. At the termination of the first input pulse, condenser 15 commences to discharge through the pulse source and device 18, and device 16 ceases to conduct so that the charge on condenser 17 remains. Just prior to the occurrence of the second pulse, the voltage at point *b* is zero, as indicated in Fig. 2*b*, while the voltage at point *c* is $e_1$, as indicated in Fig. 2*c*. Upon application of the second pulse, the device 16 commences to conduct substantially immediately inasmuch as the voltage at point *b* rises almost instantaneously to $e_1$. When device 16 conducts, condenser 17 receives an additional charge which is somewhat less than the voltage $e_1$, the total charge on condenser 17 becoming $e_2$, as indicated in Fig. 2*c*. At the termination of the second pulse, the potential at point *b* again drops to zero during discharge of condenser 15, as indicated in Fig. 2*b*, while the potential at point *c* remains at the value $e_2$. Upon commencement of the third pulse, the potential at point *b* rises to the value $e_2$, as indicated in Fig. 2*b*, at which time device 16 conducts and condenser 17 receives an additional charge. When the charge on condenser 17 reaches $e_3$, which, in this example, is the bias voltage E on the grid of tube $V_1$, the tube $V_1$ commences to conduct. When $V_1$ conducts, its plate potential decreases. This decrease is applied to the grid of $V_2$ through condenser 23, decreasing the current in $V_2$. The decrease in current lowers the potential of the cathodes of $V_1$ and $V_2$, causing $V_1$ to conduct more, thereby decreasing the potential on the grid of tube $V_2$ still further. This operation continues until tube $V_2$ is completely cut off. Actually, $V_2$ is cut off almost instantaneously. Asymmetrically conducting device 24 is poled to prevent the grid of tube $V_2$ from being driven below ground potential. Simultaneously, the plate potential of $V_2$ rises, resulting in an increase in output voltage, as shown in Fig. 2*d*.

With the grid of tube $V_2$ at ground potential, and the grid of tube $V_1$ at E volts, asymmetrically conducting device 13 commences to conduct, discharging condenser 17 through device 13, condenser 23, and tube $V_1$. Condenser 23 also draws current through device 24 as it discharges to the plate voltage of $V_1$. In order that condenser 17 may be discharged completely in time for the next counting cycle, it is necessary that its discharge path time constant be less than the discharging time constant of condenser 23, which is determined by the path including device 24 as well as the path including condenser 17 and device 13. It is obvious, therefore, that careful selection of the values of condensers 17 and 23 must be made to insure accurate resetting. As condenser 23 continues to discharge, the grid of tube $V_2$ rises toward cut-off. When cut-off is reached, tube $V_2$ commences to conduct, and the output voltage drops to its steady state value, as shown in Fig. 2*d*.

From the foregoing explanation, it can be seen that by varying the triggering level of tube $V_1$, the frequency ratio can be changed. In the present invention, the voltage source 26 is made variable. Adjustment of the bias on tube $V_2$ by varying source 26 automatically adjusts the bias on tube $V_1$ and as a result, the triggering level.

In certain applications where the period between sets of pulses to be counted may vary, it becomes necessary to select asymmetrically conducting devices which have a very high back resistance to prevent charging of the condenser 17 while tube $V_2$ is conducting. In such a case, the time constant of the charging circuit is considerably greater than the period between sets of pulses so that the charge accumulated on the condenser 17 during that period is negligible.

It is to be understood that the above described arrangement is merely illustrative of the application of the principles of the invention and numerous other arrangements might be devised by those skilled in the art without departing from the spirit and scope of the present invention.

What is claimed is:

1. A counter circuit comprising, in combination, a storage circuit having an energy storage device, and a pulse generating circuit comprising first and second electron discharge devices, each of said devices having at least an anode, a cathode, and a control electrode, sources of operating potential therefor and means interconnecting the electrodes of said devices and said sources as a monostable multivibrator, the control electrode of said first discharge device being connected to said energy storage device, the control electrode of said second discharge device being connected to an additional potential source, and asymmetrically conducting means connecting the control electrode of said second discharge device to said energy storage device.

2. A counter circuit for generating a signal proportional to the frequency of occurrence of input signals comprising an energy storage circuit for storing incremental portions of successive input impulses, said energy storage circuit including an energy storage device, pulse generating means connected to said energy storage means and responsive to the voltage level on said energy storage device for generating an output pulse, said pulse generating means including first and second electron discharge devices, each of said devices having a cathode, an anode, and a control electrode, sources of operating potential and means interconnecting said sources and said electrodes to form a pulse circuit having one condition of temporary stability, the control electrode of said first discharge device being connected to said energy storage device, means for varying the voltage level on said energy storage device at which said pulse generating means becomes responsive comprising a variable voltage source connected to the control electrode of said second discharge device, and means for discharging said energy storage device after the commencement of the output pulse and before commencement of the next input pulse including a first asymmetrically conducting device connected between the control electrodes of said first and second discharge devices, and a second asymmetrically conducting device connected to the control electrode of said second discharge device across said variable voltage source.

3. A counter circuit for generating a signal proportional to the frequency of occurrence of input signals comprising means for storing portions of each successive input signal; pulse generating means comprising a monostable multivibrator having first and second electron discharge devices, each of said devices having a control electrode, said pulse generating means being connected to said energy storage means and responsive to the voltage level in said storage means for generating an output signal; separate means including an asymmetrically conducting device connected between the two control electrodes for discharging said energy storage means after the commencement of the output signal and before the commencement of the next input signal; said asymmetrically conducting device commencing conduction after the commencement of said output signal; and means including a variable voltage source for varying the voltage level in said energy storage means at which the pulse generating means becomes responsive.

References Cited in the file of this patent

UNITED STATES PATENTS

| | | |
|---|---|---|
| 2,469,031 | Canfora | May 3, 1949 |
| 2,518,499 | Smith | Aug. 15, 1950 |
| 2,539,374 | Pourciau et al. | Jan. 23, 1951 |
| 2,573,150 | Lacy | Oct. 30, 1951 |
| 2,653,236 | Phelan | Sept. 22, 1953 |
| 2,703,364 | Birnbaum | Mar. 1, 1955 |
| 2,710,347 | Brady | June 7, 1955 |